US006908680B2

(12) United States Patent
Kirby et al.

(10) Patent No.: US 6,908,680 B2
(45) Date of Patent: Jun. 21, 2005

(54) METHOD FOR OBTAINING REDUCED THERMAL FLUX IN SILICONE RESIN COMPOSITES

(75) Inventors: Kevin W. Kirby, Calabasas Hills, CA (US); John J. Vajo, West Hills, CA (US); Anthony Jankiewicz, Seattle, WA (US); John Herold, Tucson, AZ (US); Carlos Valenzuela, Tucson, AZ (US); Frank Judnich, Tucson, AZ (US); Wayne Anderson, Tucson, AZ (US)

(73) Assignees: HRL Laboratories, LLC, Malibu, CA (US); Raytheon Company, Lexington, MA (US)

( * ) Notice: Subject to any disclaimer, the term of this patent is extended or adjusted under 35 U.S.C. 154(b) by 0 days.

(21) Appl. No.: 10/421,952

(22) Filed: Apr. 22, 2003

(65) Prior Publication Data

US 2003/0235673 A1 Dec. 25, 2003

Related U.S. Application Data

(62) Division of application No. 09/650,317, filed on Aug. 29, 2000, now Pat. No. 6,551,663.

(51) Int. Cl.[7] .................................................. B32B 9/04

(52) U.S. Cl. ....................... 428/446; 427/492; 427/508; 427/515; 427/521; 428/447; 428/448; 428/451; 428/688; 524/424; 524/588

(58) Field of Search ................................ 428/446, 447, 428/448, 451, 688; 427/492, 508, 515, 521, 387; 524/424, 588

(56) References Cited

U.S. PATENT DOCUMENTS 3,203,849 A 8/1965 Katz et al. .................... 161/96
3,716,610 A 2/1973 Goldstein .................. 264/152
4,246,313 A 1/1981 Stengle, Jr. ................. 428/266
5,824,404 A 10/1998 Brown et al. ............ 428/301.4
5,979,826 A 11/1999 Brown et al. ............... 244/121
6,551,663 B1 4/2003 Kirby et al. ................ 427/387

OTHER PUBLICATIONS

Brown, J., et al., "Oxygen Plasma Conversion of Silicone–Matrix Composites," Hughes Missile Systems Company, pp 2–6 (Apr. 24, 1996).

Vajo, J., et al., "Laser Conversion and Surface Analysis of SM 8027 Samples," Hughes Research Laboratories, 18 pages (May 3, 1996).

Wilson, D., et al., "Development of silicone matrix–based advanced composites for thermal protection," *High Perform. Polym.*, vol. 6, pp 165–181 (1994).

A copy of the PCT International Search Report (4 pages) for PCT Application No. PCT/US01/41895, which corresponds to the above–identified U.S. Appl. No. 10/421,952.

A copy of the PCT Written Opinion (6 pages) for PCT Application No. PCT/US01/41895, which corresponds to the above–identified U.S. Appl. No. 10/421,952.

*Primary Examiner*—Margaret G. Moore
*Assistant Examiner*—Marc S Zimmer
(74) *Attorney, Agent, or Firm*—Ladas & Parry LLP

(57) ABSTRACT

A method for improving the thermal barrier properties of silicone resin/glass fiber composites. Composites comprising a layer of polysiloxane (silicone resin) matrix with a glass or quartz fiber reinforcement embedded in such matrix and an organic polymeric layer were subjected to multi-cycle heat treatment, preferably with quartz lamps. The polysiloxane layer was pre-coated with graphite dispersion in order to ensure acceptable optical receptivity of the polysiloxane layer. As a result, the silicone resin was converted into a thick porous layer of silicone dioxide, the latter having the improved thermal barrier properties.

53 Claims, 3 Drawing Sheets

METHOD FOR OBTAINING REDUCED THERMAL FLUX IN SILICONE RESIN COMPOSITES

Figure 1:
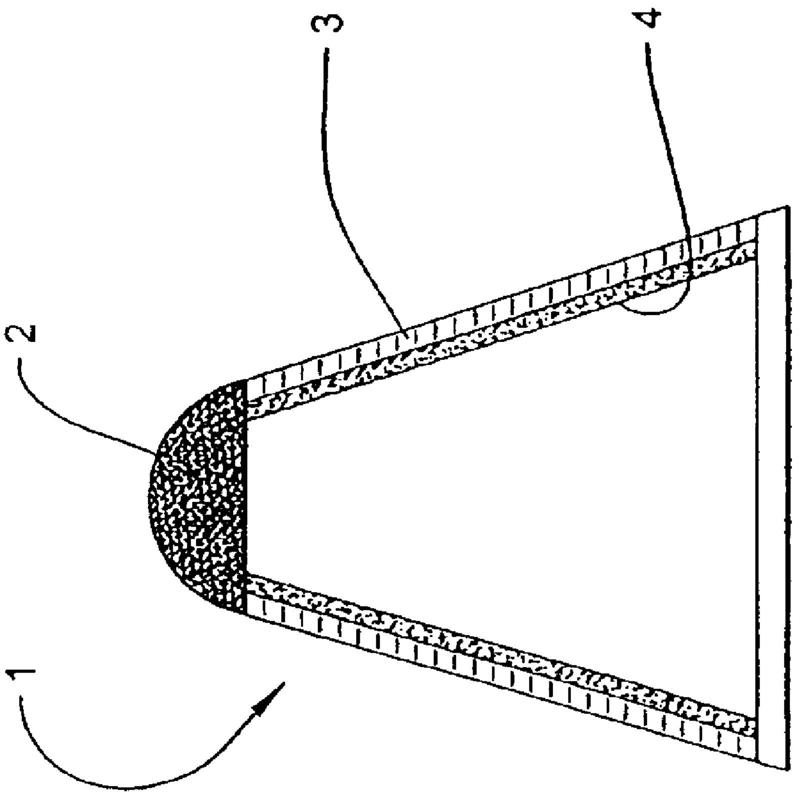

This is a divisional of U.S. application Ser. No. 09/650,317 filed on Aug. 29, 2000, now U.S. Pat. No. 6,551,663. The entire disclosure of U.S. application Ser. No. 09/650,317 (including the description, claims, abstract and drawings) is incorporated herein in its entirety by this reference.

STATEMENT OF GOVERNMENT INTEREST

This invention was made with government support and the government has certain rights in this invention.

I. BACKGROUND OF THE INVENTION

1. Field of the Invention

This invention relates to improvements in the thermal barrier properties of silicone resin/glass fiber composites. More particularly, it pertains to the use of a thermal treatment of composites comprising a polysiloxane (silicone resin) matrix with a glass or quartz fiber reinforcement embedded in such matrix in order to effect a chemical change in the structure of the composite from silicone resin into porous silicone dioxide, the latter having improved thermal barrier properties.

2. Description of the Related Art

Missile nosecones and other missile components have recently been manufactured as composite structures that consist of an outer thermal protection layer of a silicone resin/glass fiber material surrounding an inner structural layer of bismaleimide resin/graphite fiber. As the missile approaches high speeds, the surface of the composite structure can reach temperatures up to 1,200° C. for brief (less than 2 minutes) periods of time. These temperatures are well above the temperatures under which bismaleimide resin would undergo substantial degradation and destruction, even after short periods of exposure. In some applications other than in the field of space technologies, there exist polymeric surfaces subject to brief exposure to very high temperatures as well.

The purpose of the silicone resin-based layer is to act as a thermal barrier such that the underlying structural layers hopefully experience temperatures only below that at which degradation occurs. This thermal barrier is achieved when the precursor silicone resin is chemically changed to form a relatively thick layer of a porous silicone dioxide.

There is a need to enhance further the thermal protection properties of polysiloxane based composites. As will be seen, the creation of a porous matrix structure in general and of a porous silicone dioxide in particular is helpful in this regard. There have been efforts, however, to improve the susceptibility of this type of composite to erosion, mechanical damage (like impact) and chemical attack through surface modifications.

In particular, U.S. Pat. No. 5,824,404 teaches that oxygen plasma or quartz lamp treatment of an uncoated silicone resin composite can cause the conversion of the polysiloxane groups into silica in the first few micrometers just beneath the surface. This so formed silica is believed to improve the mechanical properties of the composite surface. But the prior art does not teach a method for improving thermal protection of the composite surface via such polysiloxane-silica transformation. The silicone resin composite layer itself provides only a primary, and insufficient, barrier against high temperatures.

While thermal protection is certainly known in the prior art, there remains a need for even better thermal protection technology. The method proposed herein provides such improved thermal protection.

II. SUMMARY OF THE INVENTION

The present invention is directed to a non-contact method for treating a filled silicone resin composite structure such that the thermal protection properties are significantly improved because the thermal flux through the composite layer is significantly reduced. Therefore, any material which lies underneath a protective layer of the filled silicone resin composite will receive superior thermal protection. Such protection is especially important when a material to be so protected is an organic polymer material. As it is well known, organic polymeric materials, with rare exceptions, are generally thermally unstable and degrade and decompose when subjected to elevated temperatures over 300° C.

In particular, a bismaleimide resin filled with a graphite fiber is a common material used to manufacture an inner layer of missile nosecones. The heat flux to the such inner bismaleimide resin/graphite fiber layer is reduced by the present invention thus preventing thermal decomposition and outgassing of this inner layer material. Reduced outgassing is of critical importance in the case of the nosecone since debris sensitive tracking optics are typically enclosed within this type of structure.

To effect the improved thermal barrier property in the material, the composite surface is first coated with a thin layer of a highly optically absorptive material, for instance dispersed graphite. The composite surface is then exposed to a periodic fluence of optical radiation, such as that produced by a bank of pulsed quartz lamps. The absorbed light imparts heat to the near surface region of the composite causing chemical reactions to occur in the polysiloxane. One consequence of these chemical reactions is the formation of a porous matrix within the resin. The increased porosity acts to decrease the thermal conductivity, and hence the thermal flux capability of the composite structure.

The use of an optically absorptive coating, such as dispersed graphite, in combination with the quartz lamp treatment to produce a porous silica matrix in a silicone resin/glass fiber composite is necessary because without the graphite or similar coating the composite would not absorb the amount of light radiation necessary to cause the formation of the silica matrix.

III. BRIEF DESCRIPTION OF THE DRAWINGS

The features and advantages of the present invention will become better understood with regard to the following description, appended claims, and accompanying drawings where FIG. 1 is a cross-section of a missile nosecone which is a preferred embodiment of this invention.

Figures 2A, 2B:
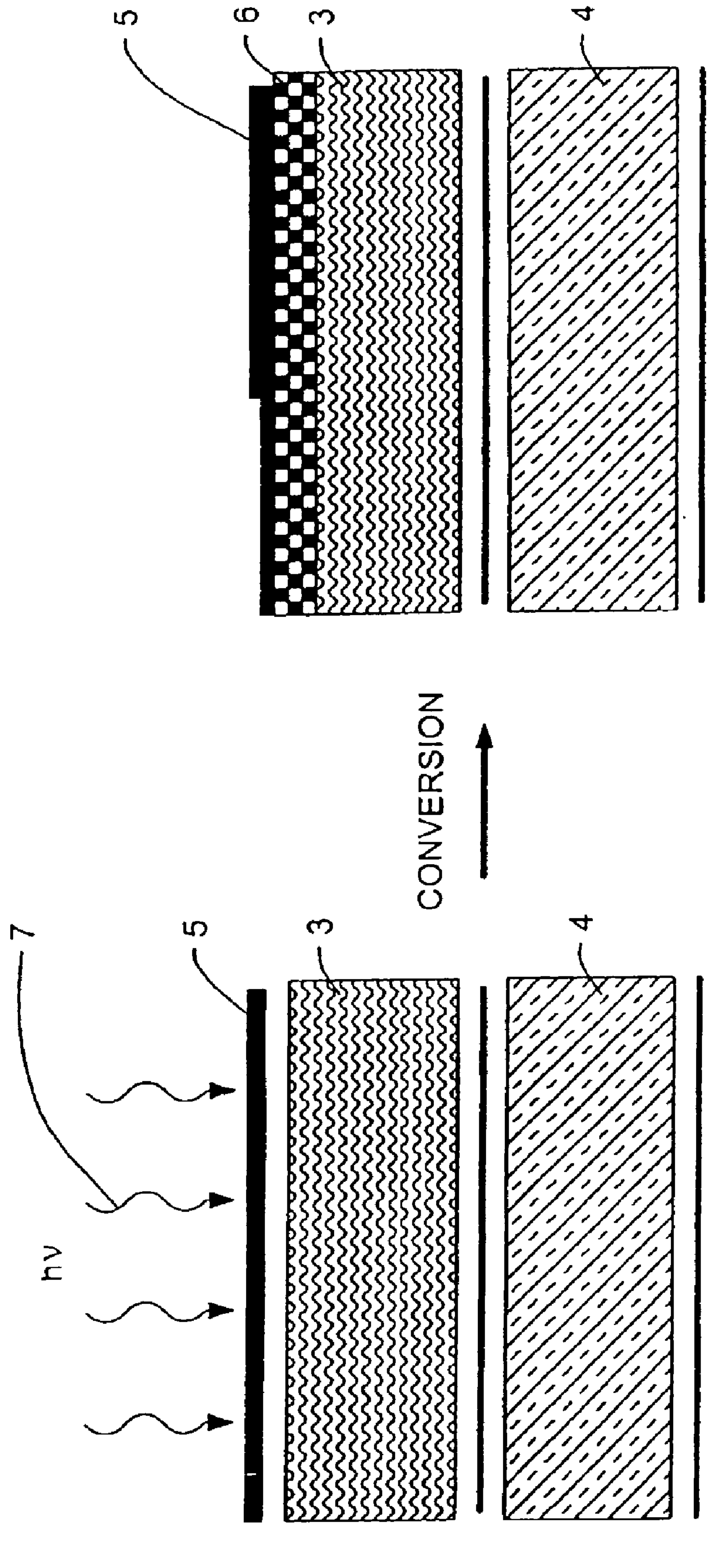
Figure 3:
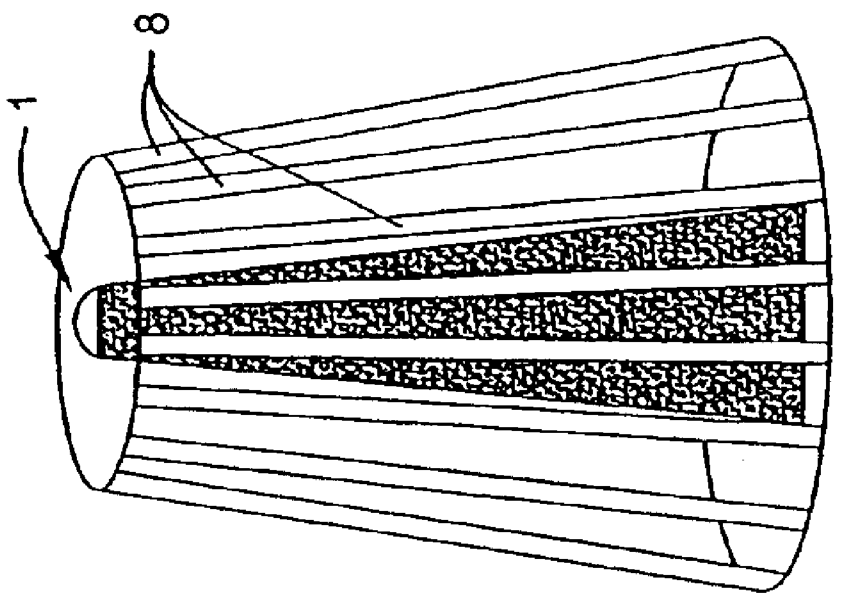

FIG. 2(*a*) represents a diagram schematically showing exposure of a silicone resin composite material to light radiation FIG. 2(*b*) represents a diagram schematically showing a conversion of a silicone resin composite material into silicon dioxide FIG. 3 is a diagram schematically showing a half ring of contoured quartz lamps and their location relative to the nosecone.

IV. DETAILED DESCRIPTION OF THE INVENTION

1. The Method in General.

The method comprises three principal steps. First, a layer of a silicone resin composite material is applied onto a surface to be protected from thermal degradation. Any protected surface will experience the reduction in the thermal flux, but, as mentioned above and subsequently discussed further, such protection is especially important for organic polymeric materials, an overwhelming majority of which are relatively thermally unstable.

Next, the surface of the silicone resin composite is coated with a layer of a highly optically absorptive material. This step is very important and is necessary when a quartz-lamp heat treatment (or other methods of heating using light radiation) is subsequently used because, without it, the method would not be viable due to poor light absorption characteristics of the silicone resin-based composites.

Finally, the coated surface of the silicone resin is subjected to heat treatment. Any type of heat treatment capable of producing the temperatures on the surface in the preferred range of between about 315° C. and about 515° C. is acceptable, but as described, infra, the quartz-lamp heat treatment is preferred.

As a result of this three-step process, the silicone resin composite is heated to temperatures between about 315° C. and about 515° C. At these elevated temperature, the polysiloxane structure of the composite undergoes a series of complex chemical and physical transformations. Processes of polycondensation and deep tri-dimensional cross-linking rapidly accelerate leading eventually to a basic silicon dioxide (silica) structure.

This silica structure has an increased heat resistance. In addition, a number of by-products of these processes are gases and water which leaves the composite structure in a gaseous form of a water vapor. These gases and vapor exiting the composite structure help transform the already formed silica into a porous matrix further improving silica's heat insulating properties. The underlying surface thus benefits from receiving reduced heat flux. The thermal protection of the underlying substrate is therefore substantially improved.

The features of the present invention will be better understood after considering the following description of a preferred and alternative embodiments of the invention.

2. A Preferred Embodiment

A preferred embodiment of this invention, described in general, supra, comprises using the method for obtaining a reduced thermal flux in silicone resin composite materials employed in manufacturing missiles' nosecones. The preferred embodiment is described below.

The nosecone 1, comprising a titanium tip 2, is a composite two-layer structure of an outer thermal protection layer of a silicone resin/glass fiber material 3 surrounding an inner structural layer of an organic polymeric material 4 comprising graphite fiber material and/or quartz. The inner structural layer is made of bismaleimide resin (BMI) comprising graphite fiber material and/or quartz which is the preferred organic polymeric material. It is cured at elevated temperatures within the range of between about 315° C. and about 340° C.

After the (BMI) comprising graphite fiber material and/or quartz of the inner layer 4 has been cured, the outer thermal protection layer 3 of a silicone resin/glass fiber material is applied on the surface of the inner structural BMI-based layer, preferably by the wrapping and weaving the outer layer 3 over the inner structural layer 4. The thickness of the inner layer 4 is up to about 10 millimeters, preferably, about 2.5 millimeters.

The silicone resin/glass fiber material is, for example, a polydimethylsiloxane-based product produced by Fiberite, Inc. of Tempe, Ariz., with a commercial designation of SM 8029. This material, the preferred silicone resin/glass fiber material, is cured at elevated temperatures within the range of between about 175° C., and about 240° C. This silicone resin/glass fiber material layer preferably contains 50%(by weight) of glass fiber. The thickness of this layer is up to about 10 millimeters, preferably, about 2.5 millimeters.

To effect the improved thermal barrier property in the material, the composite outer polysiloxane-based surface 3 is first coated with a thin layer of a highly optically absorptive material 5, preferably dispersed graphite. The dispersed graphite coating 5 is preferably applied by spraying, before further being exposed to the quartz lamp treatments. The nosecone 1 surface is sprayed with an aerosol graphite dispersion until a thin, uniform, continuous black layer 5 is formed. The thickness of such graphite layer 5 is between about 10 micrometers to about 100 micrometers, preferably, about 10 micrometers.

This step is of applying a coating of a highly optically absorptive material is necessary as, without it, the method would not be viable due to poor light absorption characteristics of the polysiloxane-based materials.

The composite surface is then exposed to heat using light radiation hν 7. A quartz-lamp heating is used in the preferred embodiment.

A setup for the heating procedure is schematically illustrated in FIG. 3. A bank of quartz lamps 8 emanating energy hν 7 is constructed with underlying reflectors such that the nosecone 1 is uniformly irradiated from tip 2 to aft around approximately half of the its circumference. Ten to twenty commercially available quartz lamps 8 are conveniently used. The nosecone 1 is positioned such that the quartz lamps are approximately 1–2 inches from the exterior surface of the nosecone 1.

The process of heating of nosecone 1 produces substantial amounts of flammable gaseous by-products that tend to ignite due to their high concentration. In order to have these gases dissipate quickly, a fan is also used (not shown). In order to further reduce the fire hazard the quartz lamps 8 are located to occupy only a half circle instead of fully enveloping nosecone 1.

Quartz lamps 8 are positioned in such a way as to achieve uniform illumination over any given area of nosecone 1 regardless of that area's location. Those skilled in the art will recognize the described setup of quartz lamps 8 as readily modifiable if necessary to achieve such uniform illumination while avoiding a risk of fire at the same time.

A type K thermocouple with a silicon wafer junction (not shown) is used to measure the temperature at the nosecone surface. The quartz lamps 8 are illuminated by applying a preset voltage from a power supply for a specified period of time, as subsequently discussed. Before applying the full preset voltage to the lamps, a 30 second preheat at 0.5 V is applied to avoid lamp failure. After each cycle, the nosecone 1 is allowed to cool for at least 30–60 seconds before the next exposure.

The preferred embodiment of the invention, which is applied to the partial nosecone, is described below. Limitations in the output power from the quartz lamp power supply require that separate heating recipes be developed for the partial and full-sized nosecone. These separate heating recipes do not differ in terms of the experimental approach or the effect on the material and are required strictly due to the size difference between the partial and full-sized nosecones.

The heating process described below and shown on FIGS. 2(*a*) and 2(*b*) is designed to create a modification to the silicone resine layer 3 that is positioned above the surface of the inner layer 4. As a result of the heating process, a thin porous sub-layer of silica is formed on top of a second, thicker, porous sub-layer comprising partially decomposed silicone resin. The second sub-layer forms from the original silicone resin undergoing secondary curing and cross-linking reactions. Formation of both silica sub-layer and the underlying sub-layer of partially decomposed silicone resin requires heat and is accompanied by evolution of gases. These two sub-layers form together a thermally insulating porous layer 6.

Prolonged heating at high temperatures leads to uncontrollable conversion and secondary curing reactions with a very high rate of the formation of the gases. The gases form large bubbles rapidly exiting outer layer 3 leading to the loss of adhesion between inner layer 4 and outer layer 3 and even to the delamination of the latter. Hence, the thermal protection is minimized.

Therefore, it is important to slow down the conversion/secondary curing process in order to prevent the violent formation and evolution of gas bubbles. It is determined that such objective can be reached by exposing the outer layer 3 to brief, cyclical exposure to high temperatures, as subsequently described. As a result the structure in both sub-layers remains mechanically intact.

Those skilled in the art will recognize the heating process recited below as modifiable to apply it to the full-sized nosecones if necessary. They will also recognize the heating process as modifiable to affect the conversion and the secondary curing process at acceptable rates.

For reference purposes, the base circumference of the cone is divided into degrees, with 0° arbitrarily chosen as the starting point position for exposure to the quartz lamps 8. Through experimentation, voltage settings of 3.0–3.75 V consistently produce thermocouple temperatures in the 315–515° C. range, respectively, at the nosecone surface. However, present invention is not limited to these voltages, and any other voltage setting which will bring about the thermocouple temperatures in the 315–515° C. range can be used. Differences in the absorptivity of the thermocouple junction as compared to the coated nosecone surface produces some uncertainty in the actual temperature achieved in the material during irradiation, although such variance in the temperature is estimated to be small. The observed thermocouple temperature reproducibility for a specific voltage setting is ±25° F. (14° C.).

The quartz lamp treatment of the nosecone begins with a 6 sec exposure at the 3.0 V setting. With the nosecone 1 in the 0° position, this procedure is repeated for a total of 5 cycles. The nosecone 1 is subsequently rotated about its longitudinal axis by 180° (to the 180° position). The previously unexposed surface of the nosecone 1 is then subjected to the same illumination sequence, namely 5 cycles at the 3.0 V setting for a duration of 6 sec each. The observed thermocouple peak temperature is consistently in the 315–345° C. range during each exposure cycle.

The second set of exposure cycles at a voltage setting of 3.25 V is performed next. Before executing the second set of cycles, the nosecone 1 is rotated about its longitudinal axis back to the original 0° position. From this original starting position, the nosecone 1 is rotated an additional 8° (to the 352° position) to eliminate overlap related uniformity problems from the illumination. At the 352° position, the nosecone 1 is exposed to 5 cycles, with each cycle having a duration of 6 sec. The nosecone 1 is subsequently rotated about its longitudinal axis by 180° (to the 172° position). At the new 172° position, the nosecone 1 is exposed to 5 additional cycles, with each cycle having a duration of 6 sec. The observed thermocouple peak temperature is consistently in the 370–400° C. range during each exposure cycle.

The third set of exposure cycles at a voltage setting of 3.50 V is performed next. Before executing the third set of cycles, the nosecone 1 is rotated about its longitudinal axis back to the original 0° position. From this original starting position, the nosecone 1 is rotated by another 8° (to the 8° position). At the 8° position, the nosecone 1 is exposed to 5 cycles, with each cycle having a duration of 6 sec. The nosecone 1 is subsequently rotated about its longitudinal axis by 180° (to the 188° position). At the new 188° position, the nosecone 1 is exposed to 5 additional cycles, with each cycle having a duration of 6 sec. The observed thermocouple peak temperature is consistently in the 420–450° C. range during each exposure cycle.

The fourth and final set of exposure cycles at a voltage setting of 3.75 V is performed last. Before executing the final set of cycles, the nosecone 1 is rotated about its longitudinal axis back to the original 0° position. At the 0° position, the nosecone 1 is exposed to a single cycle with a duration of 6 sec. Before the next cycle, the nosecone 1 is rotated about its longitudinal axis by 8° to the 352° position. At this position, the nosecone 1 is exposed to a single cycle with a duration of 6 sec. The nosecone 1 is subsequently rotated about its longitudinal axis back to the original 0° position. At the 0° position, the nosecone 1 is exposed to a single cycle with a duration of 6 sec. Before the next cycle, the nosecone is rotated about its longitudinal axis by 8° to the 8° position. At the 8° position, the nosecone 1 is exposed to a single cycle with a duration of 6 sec. Before the next cycle, the nosecone 1 is rotated about its longitudinal axis by 8° back to the original 0° position. At this position, the nosecone 1 is exposed to a single cycle with a duration of 6 sec. This rocking pattern for each of the irradiation cycles is again intended to improve the exposure uniformity. Before continuing with the final set of exposure cycles, the nosecone 1 is rotated about its longitudinal axis to the 180° position. At the 180° position, the nosecone 1 is exposed to a single cycle with a duration of 6 sec. An identical rocking pattern from the 180° position is subsequently followed for the next 4 exposure cycles of 6 sec each. The observed thermocouple peak temperature is consistently in the 470–515° C. range during each exposure cycle.

As a result of the thermal surface treatment described above a thermal barrier is achieved when the precursor silicone resin is chemically changed to form a relatively thick layer 6 of a porous silicone dioxide. Such barrier serves as an effective means for protection of the underlying organic polymeric layer from thermal degradation. Unlike prior art where the layer of silicone dioxide is only a few micrometers thick, it is much thicker here, with its thickness being about 1 millimeter. Such increased thickness serves to greatly enhance its thermal insulation properties.

To investigate the effects and potential benefits of the quartz lamp treatment, nosecone samples were tested in the wind tunnel at the Applied Physics laboratory at Johns Hopkins University of Baltimore, Md. The tunnel tests were designed to simulate a 4–1 trajectory. Test fixture geometry in the wind tunnel allowed for only partial nosecones to be tested one at a time. As a result, the wind tunnel effects on an partial nosecone exposed to the quartz lamp treatment described in this disclosure was compared to a nearly identical untreated partial nosecone. Three criteria were used to compare the results: visual appearance of the interior and exterior surfaces, integrity of the inner structural layer of bismaleimide resin/graphite fiber, and the amount of outgassing experienced on the inside of the cone.

The visual appearance of the treated and untreated cones was significantly different after the wind tunnel tests. Both nosecone samples showed extensive signs of wear on their outer surfaces, with the treated nosecone retaining a slightly greater amount of the original paint (primer only). The interior surfaces of the two cones differed more significantly. The untreated cone had many areas where the metallic liner had either delaminated or disintegrated. Tar-like deposits were found towards the aft end, while several char deposits were observed in the near tip region. There was also a large blister in the bismaleimide resin/graphite fiber layer indicating a region of severe decomposition. By contrast, the interior surface of the treated nosecone appeared nearly the same before and after the wind tunnel test. The metallic liner was only slightly discolored in some areas, and had no delamination or cracks. No blisters in the inner layer were observed.

The integrity of the inner structural layer was examined more quantitatively by thermal gravimetric analysis. This analysis technique provided information on the amount of decomposition in the layer. Results for the untreated nosecone indicated that close to the interface with the SM 8029 layer (nearer to the absolute nosecone surface), the extent of decomposition in the bismaleimide resin-based structure was 83% of its theoretical maximum. In the middle of the layer, the amount of decomposition was measured to be 53%. Similar measurements on the quartz lamp treated nosecone indicated the extent of decomposition was 68% and 41% respectively.

The figure of merit for the amount of outgassing experienced in the interior of the nosecone during the wind tunnel test was the measured transmission loss through the missile seeker optics. The seeker optics were positioned inside the nosecones during the test, and consequently became coated with the thermal decomposition byproducts. An acceptable level for transmission loss was determined to be 1–3%. In the case of the quartz lamp treated nosecone, the transmission loss was measured to be ~2%.

The best untreated nosecones produced significantly worse transmission losses in the 18–26% range.

2. Alternative Embodiments

Other embodiments of this invention comprise using this method to protect various organic polymeric surfaces subject to brief exposure to very high temperatures. The inner polymeric layer to be protected and the outer, silicone resin layer, can be cured separately or jointly.

If a method of joint curing is to be used, the only limitation on the kind of the organic polymeric surfaces to be protected is that the polymers of which the surface is made must be co-curable with the silicone resins. These alternative organic materials must have the curing temperature within the same temperature range of between about 175° C. to about 240° C. as the curing temperature range for silicone resin/glass fiber material.

In the acceptable alternative embodiments, such organic materials as, for instance, epoxy, polyurethane, or phenol-formaldehyde resins, or other organic film-forming resins can be used as long as their curing temperature lies within same range as the curing temperature of the outer silicone resin layer. If the alternative organic materials are used, the outer layer can be attached to uncured inner layer, followed by joint curing of both layers at temperatures between about 175° C. to about 240° C. The preferable thickness of the inner layer is still about 2.5 millimeters.

If a separate curing method is to be used, the choice of the silicone material would be the unaffected—any silicone resin disclosed in the preferred embodiment or in a method of joint curing is acceptable. The organic inner layer must be curable at temperatures between about 315° C. and about 340° C.

Whether a joint or a separate curing method is to be chosen as an alternative embodiment, the silicone resin layer may contain more than 50% of the glass fiber, and the quartz fiber can be used instead of the glass fiber in the same amounts.

Having described the invention in connection with several embodiments thereof, modification will now suggest itself to those skilled in the art. As such, the invention is not to be limited to the described embodiments except as required by the appended claims.

We claim:

1. A precursor composite for obtaining coatings with enhanced thermal protection, comprising:

(a) a layer of an organic polymeric material to be protected from thermal degradation;

(b) a layer of a silicone resin composite applied on top of said layer of the organic polymeric material; and (c) a layer of an optically absorptive material applied to a surface of said silicone resin composite, so that when said composition is exposed to a heat treatment, wherein said heat treatment is produced by a light radiation source, a thick thermally insulating porous layer of silicon dioxide is formed, thereby ensuring a reduction in thermal flux directed at said layer of the organic polymeric material.

2. The composite as claimed in claim 1, wherein said organic polymeric material comprises:

(a) a bismaleimide resin; and (b) a filler material comprising a graphite fiber material and/or quartz.

3. The composite as claimed in claim 1, wherein said organic polymeric material comprises:

(a) an organic polymer resin curable at an elevated temperature within a range of about 175° C. to about 240° C.; and (b) a filler material comprising a graphite fiber material and/or quartz.

4. The composite as claimed in claim 1, wherein said organic polymeric material layer has a thickness up to about 10 millimeters.

5. The composite as claimed in claim 1, wherein said silicone resin composite comprises:

(a) a silicone resin curable at an elevated temperature within a range of about 175° C. to about 240° C.; and (b) a filler comprising a glass fiber and/or quartz.

6. The composite as claimed in claim 1, wherein said silicone resin composite comprises:

(a) a silicone resin selected from a group consisting of polysiloxanes; and (b) a filler comprising a glass fiber and/or quartz.

7. The composite as claimed in claim 1, wherein applying said silicone resin composite layer on top of the layer of the organic polymeric material comprises wrapping and weaving said silicone resin composite layer around said organic polymeric material layer.

8. The composite as claimed in claim 1, wherein said silicone resin composite layer has a thickness up to about 10 millimeters.

9. The composite as claimed in claim 1, wherein said optically absorptive material comprises graphite.

10. The composite as claimed in claim 1, wherein applying said optically absorptive material layer to the surface of the silicone resin composite comprises spraying.

11. The composite as claimed in claim 1, wherein said optically absorptive material layer has a thickness between about 10 micrometers and about 100 micrometers.

12. The composite as claimed in claim 2, wherein the silicone resin composite layer is applied to the layer of the organic polymeric material by a method comprising:

(a) curing said organic polymeric material at an elevated temperature within a range of about 315° C. to about 340° C.;

(b) applying said silicone resin composite layer to the organic polymeric material; and (c) curing said silicone resin composite at an elevated temperature within a range of about 175° C. to about 240° C.

13. The composite as claimed in claim 3, wherein the silicone resin composite layer is applied to the layer of the organic polymeric material by a method comprising:

(a) applying said layer of said silicone resin composite on an uncured surface of said organic polymeric material; and (b) curing both said silicone resin composite and organic polymeric material at an elevated temperature within a range of about 175° C. to about 240° C.

14. A composite comprising:

(a) a first layer comprising an organic polymeric material;

(b) a second layer on the first layer, wherein the second layer comprises a silicone resin composite;

(c) a thermally insulating porous third layer on the second layer, wherein the thermally insulating porous third layer comprises silicon dioxide; and (d) a fourth layer on the thermally insulating porous third layer, wherein the fourth layer comprises an optically absorptive material.

15. The composite as claimed in claim 14, wherein the thermally insulating porous third layer comprises:

a first porous layer comprising silica; and a second porous layer comprising partially decomposed silicone resin.

16. The composite as claimed in claim 15, wherein the second porous layer is thicker than the first porous layer.

17. The composite as claimed in claim 14, wherein the thermally insulating porous third layer is formed by exposing the silicone resin composite to heat treatment, wherein the heat treatment comprises light radiation.

18. The composite as claimed in claim 14, wherein the second layer and/or the third layer ensures a reduction in the thermal flux directed at the first layer.

19. The composite as claimed in claim 14, wherein the organic polymeric material comprises: a bismaleimide resin and a filler comprising graphite fiber and/or quartz.

20. The composite as claimed in claim 14, wherein the organic polymeric material comprises:

an organic polymer resin curable at an elevated temperature within a range of about 175° C. to about 240° C.; and a filler material comprising graphite fiber and/or quartz.

21. The composite as claimed in claim 14, wherein the first layer comprising the organic polymeric material has a thickness up to about 10 millimeters.

22. The composite as claimed in claim 14, wherein the first layer comprising the organic polymeric material has a thickness up to about 2.5 millimeters.

23. The composite as claimed in claim 14, wherein the silicone resin composite comprises:

a silicone resin comprising a silicone resin curable at an elevated temperature within a range of about 175° C. to about 240° C.; and a filler comprising glass fiber and/or quartz.

24. The composite as claimed in claim 14, wherein the silicone resin composite comprises:

a silicone resin comprising a polysiloxane; and a filler comprising glass fiber and/or quartz.

25. The composite as claimed in claim 14, wherein the second layer comprising the silicone resin composite is applied to the first layer comprising the organic polymeric material by wrapping and weaving the second layer around the first layer.

26. The composite as claimed in claim 14, wherein the second layer comprising the silicone resin composite has a thickness up to about 10 millimeters.

27. The composite as claimed in claim 14, wherein the second layer comprising the silicone resin composite has a thickness up to about 2.5 millimeters.

28. The composite as claimed in claim 14, wherein the optically absorptive material comprises graphite.

29. The composite as claimed in claim 14, wherein the fourth layer comprising the optically absorptive material has a thickness between about 10 micrometers and about 100 micrometers.

30. The composite as claimed in claim 14, wherein the fourth layer comprising the optically absorptive material has a thickness of about 10 micrometers.

31. The composite as claimed in claim 14, wherein the second layer comprising the silicone resin composite is applied to the first layer comprising the organic polymeric material by a method comprising:

(a) curing the organic polymeric material at an elevated temperature within a range of about 315° C. to about 340° C. to yield a cured organic polymeric material;

(b) applying the second layer on the cured organic polymeric material; and (c) curing the silicone resin composite at an elevated temperature within a range of about 175° C. to about 240° C.

32. The composite as claimed in claim 14, wherein the second layer comprising the silicone resin composite is applied to the first layer comprising the organic polymeric material by a method comprising:

(a) applying the second layer on an uncured surface of the organic polymeric material; and (b) curing both the silicone resin composite and the organic polymeric material at an elevated temperature within a range of about 175° C. to about 240° C.

33. The composite as claimed in claim 14, wherein the composition is made by a method comprising:

(a) applying the second layer comprising the silicone resin composite on the first layer comprising the organic polymeric material;

(b) applying the fourth layer comprising the optically absorptive material to a surface of the silicone resin composite; and (c) exposing the surface of the silicone resin composite to heat treatment, wherein a source of heat is light radiation.

34. The composite as claimed in claim 14, wherein the organic polymeric material comprises: a bismaleimide resin and a filler comprising graphite fiber and/or quartz;

wherein the silicone resin composite comprises: a silicone resin comprising a polysiloxane and a filler comprising glass fiber and/or quartz; and wherein the optically absorptive material comprises graphite.

35. The composite as claimed in claim 34, wherein the thermally insulating porous third layer comprises:

a first porous layer comprising silica; and a second porous layer comprising partially decomposed silicone resin.

36. The composite as claimed in claim 14, wherein the organic polymeric material comprises:

an organic polymer resin curable at an elevated temperature within a range of about 175° C. to about 240° C.; and a filler material comprising graphite fiber and/or quartz;

wherein the silicone resin composite comprises:

a silicone resin comprising a silicone resin curable at an elevated temperature within a range of about 175° C. to about 240° C.; and a filler comprising glass fiber and/or quartz; and wherein the optically absorptive material comprises graphite.

37. The composite as claimed in claim 36, wherein the thermally insulating-porous third layer comprises:

a first porous-layer comprising silica; and a second porous layer comprising partially decomposed silicone resin.

38. The composite as claimed in claim 31, wherein the thermally insulating porous third layer is formed by exposing the silicone resin composite to heat treatment, wherein the heat treatment comprises light radiation.

39. The composite as claimed in claim 32, wherein the thermally insulating porous third layer is formed by exposing the silicone resin composite to heat treatment, wherein the heat treatment comprises light radiation.

40. The composite as claimed in claim 1, wherein the layer of the organic polymeric material has a thickness up to about 2.5 millimeters.

41. The composite as claimed in claim 1, wherein the layer of the silicone resin composite has a thickness up to about 2.5 millimeters.

42. The composite as claimed in claim 1, wherein the layer of the optically absorptive material has a thickness of about 10 micrometers.

43. A composite:

(a) first layer comprising an organic polymeric material;

(b) a second layer on the first layer, wherein the second layer comprises a silicone resin composite; and (c) a third layer on the second layer, wherein the third layer comprises an optically absorptive material.

44. The composite as claimed in claim 43, wherein the organic polymeric material comprises: a bismaleimide resin and a filler comprising graphite fiber and/or quartz;

wherein the silicone resin composite comprises: a silicone resin comprising a polysiloxane and a filler comprising glass fiber and/or quartz; and wherein the optically absorptive material comprises graphite.

45. The composite as claimed in claim 43, wherein the organic polymeric material comprises:

an organic polymer resin curable at an elevated temperature within a range of about 175° C. to about 240° C.; and a filler material comprising graphite fiber and/or quartz;

wherein the silicone resin composite comprises:

a silicone resin comprising a silicone resin curable at an elevated temperature within a range of about 175° C. to about 240° C.; and a filler comprising glass fiber and/or quartz; and wherein the optically absorptive material comprises graphite.

46. The composite as claimed in claim 43, wherein the second layer of the silicone resin composite is applied to the first layer comprising organic polymeric material by a method comprising:

(a) curing the organic polymeric material at an elevated temperature within a range of about 315° C. to about 340° C. to yield a cured organic polymeric material;

(b) applying the second layer on the cured organic polymeric material; and (c) curing the silicone resin composite at an elevated temperature within a range of about 175° C. to about 240° C.

47. The composite as claimed in claim 43, wherein the second layer comprising the silicone resin composite is applied to the first layer comprising the organic polymeric material by a method comprising:

(a) applying the second layer on an uncured surface of the organic polymeric material; and (b) curing both the silicone resin composite and the organic polymeric material at an elevated temperature within a range of about 175° C. to about 240° C.

48. The composite as claimed in claim 43, wherein the composition is made by a method comprising:

(a) applying the second layer comprising the silicone resin composite on the first layer comprising the organic polymeric material;

(b) applying the third layer comprising the optically absorptive material to a surface of the silicone resin composite; and (c) exposing the surface of the silicone resin composite to heat treatment, wherein a source of heat is light radiation.

49. The composite as claimed in claim 43, wherein the third layer comprising the optically absorptive material is applied to the silicone resin composite by spraying.

50. The composite as claimed in claim 46, wherein the third layer comprising the optically absorptive material is applied to the silicone resin composite by spraying.

51. The composite as claimed in claim 47, wherein the third layer comprising the optically absorptive material is applied to the silicone resin composite by spraying.

52. The composite as claimed in claim 48, wherein the third layer comprising the optically absorptive material is applied to the silicone resin composite by spraying.

53. The composite in claim 43, wherein the silicone resin composite is exposed to heat treatment, wherein the heat treatment comprises light radiation.

* * * * *